(12) United States Patent
Gurevich et al.

(10) Patent No.: US 10,469,625 B2
(45) Date of Patent: Nov. 5, 2019

(54) SYSTEMS AND METHODS FOR IDENTIFYING A RETURNING WEB CLIENT

(71) Applicant: AOL Advertising Inc., New York, NY (US)

(72) Inventors: Gary Gurevich, Wheeling, IL (US); Jeffrey Zwelling, Santa Monica, CA (US); Yaniv Shalev, Kefer Sava (IL)

(73) Assignee: Oath (Americas) Inc., New York, NY (US)

( * ) Notice: Subject to any disclaimer, the term of this patent is extended or adjusted under 35 U.S.C. 154(b) by 300 days.

(21) Appl. No.: 15/481,167

(22) Filed: Apr. 6, 2017

(65) Prior Publication Data

US 2017/0214771 A1 Jul. 27, 2017

Related U.S. Application Data

(60) Continuation of application No. 14/851,386, filed on Sep. 11, 2015, now Pat. No. 9,648,142, which is a (Continued)

(51) Int. Cl.
| | |
|---|---|
| *G06F 16/30* | (2019.01) |
| *H04L 29/06* | (2006.01) |
| *G06F 21/30* | (2013.01) |
| *G06F 16/9537* | (2019.01) |
| *G06F 16/955* | (2019.01) |
| *G06F 21/44* | (2013.01) |
| *H04L 29/08* | (2006.01) |

(52) U.S. Cl.
CPC .......... *H04L 67/42* (2013.01); *G06F 16/9537* (2019.01); *G06F 16/9566* (2019.01); *G06F 21/30* (2013.01); *G06F 21/44* (2013.01); *H04L 63/101* (2013.01); *H04L 67/146* (2013.01); *H04L 67/303* (2013.01); *H04L 67/02* (2013.01)

(58) Field of Classification Search
CPC ............................. G06F 21/44; H04L 67/146
See application file for complete search history.

(56) References Cited

U.S. PATENT DOCUMENTS

| | | |
|---|---|---|
| 6,496,824 B1 | 12/2002 | Wilf |
| 8,352,494 B1 | 1/2013 | Badoiu |
| | (Continued) | |

*Primary Examiner* — Mahesh H Dwivedi
(74) *Attorney, Agent, or Firm* — Bookoff McAndrews, PLLC

(57) ABSTRACT

Methods and systems are provided for identifying unique devices and/or unique users of a web-based system within constraints of an external application. In some embodiments the process comprises receiving request information from a client device at an application server, using such information to form a device fingerprint, and attempting to match the newly-formed fingerprint with exactly one fingerprint stored in a database of previously-formed fingerprints. Some embodiments utilize a two-stage Locality-Sensitive Hash query technique. The client device fingerprint may be converted into a series of LSH values which may be used to find a matching fingerprint. A first stage may query input LSH values against LSH values in a data store, and a second stage may query LSH values temporarily held in volatile memory, thereby minimizing network traffic and reducing a total process time.

14 Claims, 3 Drawing Sheets

Related U.S. Application Data division of application No. 13/530,989, filed on Jun. 22, 2012, now Pat. No. 9,165,124.

(60) Provisional application No. 61/593,474, filed on Feb. 1, 2012.

(56) References Cited

U.S. PATENT DOCUMENTS

| | | |
|---|---|---|
| 8,374,386 B2 | 2/2013 | Bayram et al. |
| 8,769,683 B1 | 7/2014 | Oliver |
| 2006/0224752 A1* | 10/2006 | Parekh ............. H04L 29/12066 709/230 |
| 2007/0253608 A1 | 11/2007 | Tulyakov et al. |
| 2008/0086558 A1* | 4/2008 | Bahadori ............ G06F 11/3438 709/224 |
| 2009/0052784 A1 | 2/2009 | Covell et al. |
| 2009/0083269 A1 | 3/2009 | Artz, Jr. et al. |
| 2009/0327913 A1* | 12/2009 | Adar ..................... G06F 16/955 715/745 |
| 2010/0305989 A1 | 12/2010 | Mu et al. |
| 2011/0288940 A1* | 11/2011 | Horadan ............. F16K 31/0634 705/14.69 |
| 2012/0311027 A1 | 12/2012 | Salusky et al. |
| 2013/0318249 A1* | 11/2013 | McDonough ........... H04L 67/02 709/228 |

\* cited by examiner

SYSTEMS AND METHODS FOR IDENTIFYING A RETURNING WEB CLIENT

CROSS REFERENCE TO RELATED APPLICATIONS

This application is a continuation of U.S. patent application Ser. No. 14/851,386, filed Sep. 11, 2015, which is a divisional of U.S. patent application Ser. No. 13/530,989, filed Jun. 22, 2012, which claims the benefit under 35 USC § 119 of U.S. Provisional Patent Application No. 61/593,474, filed Feb. 1, 2012, all of which are hereby incorporated by reference in their entirety.

FIELD OF THE INVENTION

This disclosure generally relates to computer systems configured to communicate in a client/server architecture over the Internet and more particularly to systems and methods for uniquely identifying client devices.

BACKGROUND OF THE INVENTION

Computer systems coupled to a data communications network, such as the Internet, allow for the exchange of a wide variety of information between users of such computer systems. One popular use of computer networks, such as the Internet, allows users to operate client communications software, known as a web browser, to communicate with remote computer systems, known as web servers, in order to browse web pages on the world wide web. The world wide web is generally a collection of web server computer systems that each operates web server software that communicates using a number of different data communications protocols and data formats, to allow each user's browser to make web page requests to the web servers. In response to these web page requests, web servers obtain (e.g., from storage, or via dynamic generation) the requested web pages and serve those pages back to each user's web browser for viewing by the user.

Many applications running on an application server communicate with a client device through a web-based interface using, for example, the Hypertext Transfer Protocol ("HTTP"). Such application servers may need to maintain state, meaning that they may need the ability to recognize requests from the same client in order to save information about the client from one request to another. The server may maintain a session for each client that makes requests, so that the server will send the client Web pages based upon the information in previous requests from the same client. One example is a newspaper Web site that charges users for each article that the user reads. The newspaper application needs to remember which articles the user has previously read in order not to charge the user more than once for a particular article. Another example is a Web shopping site having a shopping cart application for storing the goods that the user wishes to buy. The shopping cart application needs to ensure that, as the user browses through the site's Web pages, the shopping cart retains the goods the user has placed there.

It is well known that HTTP is a stateless protocol, which means that an HTTP server handles each request from a client independently from all other requests from the same client. Therefore, a number of techniques have been developed in order to add state to the HTTP protocol. Examples are "cookies" altering URLs to include encoded session data, and various user authentication protocols.

SUMMARY OF THE INVENTION

Recently, the notion of device fingerprinting has provided another mechanism for identifying client requests as originating from a returning client. The present disclosure is directed to a significantly more efficient approach for identification of devices based on their fingerprints. Device fingerprinting generally involves collecting information about the client computing device transmitted as part of the client's HTTP request, and/or in response to requests sent by a web server (e.g., in the form of client-executable scripts or applications) for more information from the client. For example, U.S. Pat. No. 6,496,824 to Wilf, entitled "Session Management Over A Stateless Protocol," incorporated herein by reference, shows and describes some embodiments of device fingerprinting methods.

In a first aspect, the invention pertains to a method of identifying a client computing device implemented on an identification computing device comprising a communication channel with a data storage device. The method comprise performing a first query with less than all available input Locality Sensitive Hash (LSH) values where the first query performed against a data store comprising a plurality of stored LSH values associated with a plurality of stored device fingerprints each fingerprint comprising a set of features identifying a particular computing device. Each input LSH value can comprise a segment of an input fingerprint comprising a plurality of features obtained from a request from a client computing device. The performing a first query generally comprises identifying in the data store a plurality of candidate LSH values, the candidate LSH values associated with candidate device fingerprints, at least including one candidate LSH value matching at least one of the less than all input LSH values. The method also comprises performing a second query with at least one of the input LSH values not queried in the first query, the second query performed against the candidate LSH values. The performing the second query comprises identifying the candidate LSH values matching at least one of the input LSH values not queried in the first query. In general, the method also comprises, based on responses to the first query and the second query, identifying a most closely matching device fingerprint.

In some embodiments, the identified stored LSH values associated with candidate device fingerprints are placed in the memory of the computing device and the second query is performed against the identified stored LSH values in the memory of the computing device. The memory of the computing device can be the volatile memory. In some embodiments, the identifying matching LSH values in the first query and/or second query comprises identifying exact matches. In some embodiments, the identifying matching LSH values in the first query and/or second query comprises identifying LSH values that are matched within a desired degree of similarity.

In some embodiments, the method further comprises receiving the request from a client computing device, forming the input fingerprint and forming the set of input LSH value. In some embodiments, the identifying a most closely matching device fingerprint comprises identifying a candidate device fingerprint having the largest number of query hits resulting from the first and second query. In some embodiments, the identifying a most closely matching device fingerprint comprises identifying a candidate device fingerprint having a largest weighted number of query hits resulting from the first and second queries, wherein the number of query hits resulting from the first query is weighted differently from the number of query hits resulting from the second query. In some embodiments, the identifying a most closely matching device fingerprint comprises identifying a candidate device fingerprint having a largest weighted number of query hits resulting from the first and second queries, wherein the number of query hits resulting from the first and second query is weighted by a visit history corresponding to a candidate device fingerprint.

In some embodiments, the method further comprising identifying the client computing device based on the most closely matching device fingerprint. The identifying the client computing device can comprise comparing the input device fingerprint with the most closely matching device fingerprint to determine if the input device fingerprint corresponds to the most closely matching device fingerprint within a desired degree of similarity. The comparing can comprise applying a similarity function to the input device fingerprint and the most closely matching device fingerprint. In some embodiments, the method further comprises determining that a similarity of the requesting device fingerprint and the most closely matching device fingerprint exceeds a threshold value. In some embodiments, the input device fingerprint and most closely matching device fingerprint are not within a desired degree of similarity and the method can further comprising adding the input device fingerprint and at least one of the input LSH values to the data store.

In some embodiments, the performing a second query is conducted substantially entirely in volatile memory. In some embodiments, the input fingerprint comprises n features, where n is an integer greater than one, and wherein the set of input LSH values comprises at least n input LSH values. Each input LSH value can comprise a segment of n−1 features. n can be between 2 and 100. In some embodiments, each input LSH value comprises a k-character segment of the input fingerprint and the input fingerprint comprises a concatenation of the plurality of features.

In some embodiments, the input and stored device fingerprints each comprise a user agent string, a list of installed browser plugins, a display size and/or color depth, a list of installed fonts and/or an IP address of a computing device corresponding to the request from which the request features were obtained. In some embodiments, the method further comprises storing one or more of the input LSH values and the client device fingerprint in the data store and associating the input LSH values with the client device fingerprint.

In a second aspect, the invention pertains to a method of identifying a computing device within a black box network, implemented on a fingerprint server comprising a communication channel with a data storage device. The method comprises analyzing a plurality of sequential request features received at different times, wherein the request features are obtained from a plurality of requests from a network device associated with a device fingerprint, wherein at least some of the request features are identical, and wherein the analyzing comprises identifying timing patterns in identical request features. The method further comprises determining from the timing patterns the requests originate from one or more computing devices within the black box network. In some embodiments, each request feature comprises a session identifier and wherein the analyzing comprises identifying timing patterns in identical session identifiers. In some embodiments, each request feature comprises a domain, subdomain or URL and wherein the analyzing comprises identifying timing patterns in identical domains, subdomains or URLs.

In a third aspect, the invention pertains to a system for uniquely identifying returning client computing devices. The system comprises an application server having a computer readable medium with program code stored therein that, when executed by a processor in said application server, accepts and responds to requests sent to the application server by client devices via the internet. The system further comprises, a fingerprint server in electronic communication with the application server, the fingerprint server having a computer readable medium with program code stored therein that, when executed by a processor in said fingerprint server, performs the steps of performing a first query with less than all available input Locality Sensitive Hash (LSH) values, the first query performed against a data store comprising a plurality of stored LSH values associated with a plurality of stored device fingerprints each fingerprint comprising a set of features identifying a particular computing device, wherein each input LSH value comprises a segment of an input fingerprint comprising a plurality of features obtained from a request from a client computing device. The performing a first query comprises identifying in the data store a plurality of candidate LSH values, the candidate LSH values associated with candidate device fingerprints, at least including one candidate LSH value matching at least one of the less than all input LSH values. The program code, when executed, further performs the step of performing a second query with at least one of the input LSH values not queried in the first query, the second query performed against the candidate LSH values, wherein the performing the second query comprises identifying the candidate LSH values matching at least one of the input LSH values not queried in the first query. The program code, when executed, further performs the step of, based on responses to the first query and the second query, identifying a most closely matching device fingerprint. In some embodiments, said application server, said fingerprint server and said data store comprise at least three separate physical server devices.

In a fourth aspect, the invention pertains to a method for identifying a client computing device from client request data that may comprise transitory data, in which the method is implemented by a fingerprint server comprising a communication channel with a data storage device. The method comprises performing a query with a plurality of input Locality Sensitive Hash (LSH) values, the query performed against a data store comprising a plurality of stored LSH values associated with a plurality of stored device fingerprints. Each device fingerprint comprises a set of features identifying a particular computing device and each stored LSH value comprises a segment of the associated stored device fingerprint wherein each segment is formed from only a portion of the associated device fingerprint. Each input LSH value comprises a segment of an input fingerprint comprising a plurality of features obtained from client request data identifying a client computing device, each segment formed from only a portion of the input fingerprint. The performing the query comprises investigating the data store to identify candidate LSH values, each candidate LSH value comprising a stored LSH value matching any of the input LSH values and, for each candidate LSH value, identifying candidate device fingerprints, each candidate device fingerprint comprising a stored fingerprint associated with the corresponding candidate LSH value. The method also comprises determining that a most closely matched candidate device fingerprint and the input fingerprint correspond to the same client computing device or that the input fingerprint does not correspond to any client computing device in the data store.

In some embodiments, the performing the query does not identify any candidate fingerprints associated with all of the input LSH values and further comprises identifying the most closely matched candidate fingerprint as a candidate device fingerprint having the largest number of matched LSH values. The method can further comprise applying a similarity function to the most closely matched candidate device fingerprint and the input fingerprint to obtain a value representing the degree of similarity between the two fingerprints and, if similarity of the two fingerprints meets a threshold value, determining that the most closely matched candidate device fingerprint and the input fingerprint correspond to the same client computing device, or, if the value does not meet a threshold value, determining that the input fingerprint does not correspond to any client computing device in the data store. The method can further comprise, if the threshold value is met, adding the input LSH values not matching any most closely matched LSH value and not matching any stored LSH value to the data store, wherein a most closely matched LSH value is associated with the most closely matched fingerprint; associating the stored device fingerprint corresponding to the most closely matched fingerprint with the stored LSH values matching the input LSH value; and removing the association between the stored device fingerprint corresponding to the most closely matched fingerprint and stored LSH value not matching any input LSH value. The method can also comprise, if the threshold value is met, removing from the data store any stored LSH value associated only with the stored fingerprint corresponding to the most closely matched candidate device fingerprint and not matching any input LSH value.

The method can also comprise, if the threshold value is not met, adding the input LSH values that do not have a matching stored LSH value to the data store, adding the input fingerprint to data store, and associating the added input fingerprint with the stored LSH values matching the input LSH values.

In some embodiments, the input fingerprint comprises n features, where n is an integer greater than one, and wherein the set of input LSH values comprises at least n input LSH values. Each input LSH value can comprise a segment of n−1 features of the input fingerprint. n can be between 2 and 200. In some embodiments, each input LSH value comprises a k-character segment of the input fingerprint and the input fingerprint comprises a concatenation of the plurality of features obtained from the client request data. k can be between 1 and 1000. In some embodiments, each input LSH value comprises a k-bit segment of the input fingerprint and the input fingerprint comprises a binary string formed form the plurality of features obtained from the client request data. In some embodiments, the input and stored device fingerprints each comprise a user agent string, a list of installed browser plugins, a display size and/or color depth, a list of installed fonts, and/or an IP address of a computing device corresponding to the request from which the request features were obtained.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION OF THE INVENTIONS

Figure 1:
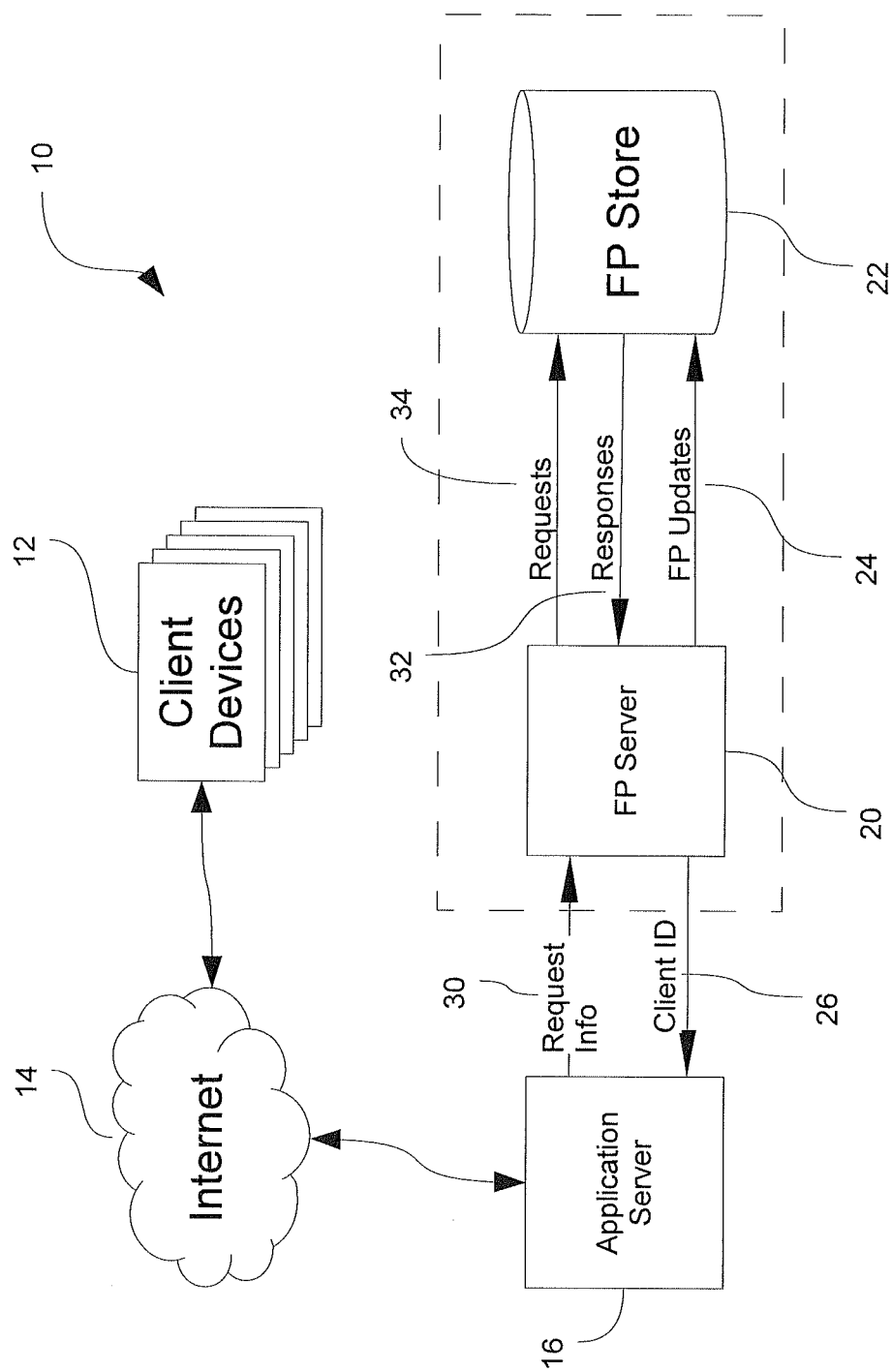
FIG. 1 is a block diagram illustrating one embodiment of a client-server arrangement for executing a client-identification process.

The methods of identifying a client computing device described herein can comprise receiving information from a client computing device ("client request data") such as, for example, HTTP header information, at an application server and using at least some such information to form a device fingerprint. The method can also comprise attempting to determine if the client computing devices is a returning device by attempting to match the newly-formed fingerprint with one fingerprint stored in a data store of previously-formed fingerprints. In some embodiments, it may be desirable to compare a new fingerprint against values stored in a database and identify a positive match (if possible) within a very short period of time. To achieve this, some embodiments of the systems and methods herein utilize a Locality-Sensitive Hash ("LSH") query technique to achieve significant improvements in efficiency. While not being limited, the methods described herein can be desirable in situations in which existing client-identification methods cannot be relied upon. For example, a site which does not require users to login may use cookies to recognize returning clients. However, users may disable or frequently delete cookies.

A typical web page is written in a markup language, such as the Hypertext Markup Language (HTML), and includes a number of embedded objects referenced by respective Uniform Resource Locators (URLs) within the HTML of a web page. The web page itself is generally referenced by a URL, as well. When a user provides a URL of a web page to a web browser (e.g., by clicking a hyperlink identifying the URL to that web page, by typing in the URL of the web page or by otherwise directing a web browser or other application to request data from the URL), the web browser performs a detailed sequence of processing tasks to obtain that web page. As an example, if the URL of the web page identifies a domain name of a server computer system on the Internet, the web browser first performs a Domain Name Service (DNS) lookup of the domain name to resolve this alphanumeric name into the Internet Protocol (IP) address of the web server on the Internet that can serve the web page referenced by the URL. Once this DNS lookup is complete, the web browser establishes a connection to the web server (e.g., a Transmission Control Protocol or TCP connection) and uses a Hypertext Transport Protocol (HTTP) to transmit a web page GET request over the connection to the web server. The HTTP GET request contains the URL of the web page to be served by the server. The web server receives this HTTP GET request, obtains or dynamically generates the web page, and returns the web page as HTML to the web browser in an HTTP response message over the connection.

As the web browser receives the HTML for the web page, the HTML of the web page may include many embedded URL's that define other objects within the web page to be obtained by the web browser. As an example, a graphic or image embedded within the web page is typically referenced with an embedded URL that specifies a server, and location (i.e., filename and directory path) within the server of that graphic or image. As the web browser encounters objects such as embedded URL's within the web page, the web browser repeats the sequence of processing described above the URL for the web page in order to obtain each embedded object, this can include performing a DNS lookup of the domain name specified in the URL (if that domain name was not previously resolved), establishing a connection to a server, and initiating an HTTP GET request to obtain the content associated with the embedded URL. Modern web pages often contain many embedded objects and URLs that reference these objects, often specifying different server computer systems from which to obtain these objects. As a result, the process of obtaining the complete content associated with a single web page including all embedded objects involves significant processing and communications activities.

Sophisticated web server software systems allow a user to visit the web site using his or her browser in order to perform transactions within the web site such as purchasing goods or services. Other types of transactions might involve navigating through a sequence of web pages to obtain desired content, performing searches for user specified information and so forth. Depending upon the purpose of the web site, a typical user transaction can involve a user visiting a number of pages and providing user input on those pages. The web server often uses input from one or more pages to produce successive web pages in a given transaction.

A typical HTTP request includes the following information: the Uniform Resource Locator (URL) of the Web page to be accessed, a "User-Agent" header and might include also "Accept" and/or "Accept-Language" headers. The User-Agent header may indicate the browser sending the request and the operating system of the computer where the browser is running. In some browsers, the language of the operating system may also be sent in the User-Agent header, while in others the OS language may be sent in the Accept-Language header. The Accept header contains the MIME types supported by the browser. The IP address of the client is part of the underlying IP packet. If the client is accessing the Internet through a proxy server, then it is the proxy's IP address which is sent as part of the underlying IP packet. Some proxies report the client's IP address in an additional HTTP header dedicated for that purpose, for example the "Forwarded-For" header or "Client-IP" header.

The methods of identifying returning client devices described herein achieve significant performance improvements in the identification of returning client computing devices by adapting locality-sensitive hashing techniques to overcome problems associated with transitory fingerprint data. Generally, client request data may comprise information that is transitory in nature. For example, a client IP address can change frequently and, therefore, may not accurately identify the same client computing device every time it is encountered by the system receiving the client request data. Furthermore, other methods for identify returning client devices based upon cookies can also have the same drawback because cookies may be deleted from the client computing device.

As described herein, locality-sensitive hashing can be used to address the problem of transitory client request data in the context of identifying returning client computing devices. Locality-Sensitive hashing, in general, refers to the dimension reduction of higher-dimensional data. Locality sensitive hashing reduces the dimensionality of identification of target information so that the improved query functions can be very efficiently performed while being very robust with respect to transitory identification information. In the context of device fingerprints, locality sensitive hashing refers to segmenting the full device fingerprint into a collection of LSH values, where each LSH value can be considered a dimension of the full device fingerprint.

Generally, LSH values can be formed from fingerprint features. In particular, a fingerprint can comprise fingerprint features, each fingerprint feature comprising a portion of the client request data, some of which may be transitory data. In some embodiments, features can individually comprise discrete conceptual units within the client request data such as, for example, a user agent string, a browser type, an IP address of the client computing device or combinations thereof. In other embodiments, a feature of a fingerprint may include non-conceptual portions of a complete fingerprint, such as a fixed-length sub-set of a complete fingerprint string.

An LSH value can comprise segments formed from an individual fingerprint feature and/or combinations of fingerprint features to achieve the dimension reduction. Additionally or alternatively, the locality sensitive hash values can be formed by forming segments and further hashing the segments using a hash function, as explained in detail below. The search for a previously-formed fingerprint matching a newly-formed fingerprint ("input fingerprint") can then involve identifying in a data store comprising stored LSH values associated with previously-formed fingerprints, stored LSH values matching the LSH values associated with the input fingerprint. As used herein, a fingerprint and its associated LSH values refer to the fingerprint and LSH values formed therefrom and vice-versa.

Importantly, because each LSH value comprises only a portion of the client request data used to form a fingerprint, a match between an input fingerprint and a stored fingerprint can be obtained when the fingerprints themselves are not exact matches. A stored fingerprint can be matched with a newly formed fingerprint even if some of the LSH values associated with the two fingerprint do not match by assessing the "closeness" of to the two fingerprints as described in detail below. By the formation of the LSH values, the evaluation of closeness can be used even when a hash function is applied that itself does not preserve closeness. The use of LSH values can address the problem of transitory client identification data because the set of LSH values associated with a newly-formed fingerprint that are otherwise identical to the set of LSH values associated with a stored device fingerprint except for the LSH values formed from transitory client identification data can still be partially matched by the remaining LSH values both fingerprints have in common. Furthermore, with respect to the data store, storing fingerprint data in a series of dimension-reduced LSH values in addition to (or in place of) storing a complete device fingerprint allows for the expansion of a device fingerprinting system to include new features without the need to re-create every stored fingerprint.

Furthermore, the use of LSH values as described herein can be coupled with data store query techniques to quickly and efficiently match a newly-formed fingerprint with a previously-formed fingerprint stored in a data store comprising stored fingerprints and associated LSH values. In particular, in some embodiments, a multiple-stage query technique can be used to match input fingerprints with stored fingerprints. With respect to a multiple-stage query comprising two stages, the first stage can involve searches for stored fingerprints in the data store having matching projections, relative to the input fingerprint, along less than all dimensions and can return or place the those matching fingerprints and/or associated LSH values into memory of the fingerprint server. A second stage search can then search in the fingerprint server memory for returned fingerprints having matching projections along at least some of the other dimensions and a most closely matching fingerprint can be determined.

During the first stage of the two-stage LSH query, a subset of the LSH values obtained from the newly-formed fingerprint can be queried against the stored LSH values in the data store. The first stage query can store into memory first query results associated with the fingerprint server stored LSH values matching the input LSH values as well as other stored LSH values that did not match the input LSH values but that are associated with stored fingerprints having a stored LSH value matching an input LSH value. The stored fingerprints associated with the returned LSH values can be referred to as candidate device fingerprints, due to the fact that stored fingerprints have at least one LSH value in common with the input fingerprint. In some embodiments, the candidate device fingerprints can be returned into memory associated with the fingerprint server along with the returned LSH values. In the second stage of the two-stage LSH query, one or more of the remaining input LSH values not queried in the first stage can be queried against the returned stored LSH values and a most closely matched candidate device fingerprint to the newly-formed fingerprint can be identified.

As described above, the two-stage LSH query can perform a significant portion of the search for a matching fingerprint in the memory of the fingerprint server, thereby reducing network traffic and/or reducing processing time. In general, the second stage query can search for a matching fingerprint in the memory of the fingerprint server so that accessing the data store during the second stage of LSH query is not required. In some embodiments, the first stage query can return LSH values associated with candidate device fingerprints into the memory associated with the fingerprint server, and the second-stage inquiry can be performed with little or no access to the original data store. In other embodiments, the first stage query can return locations of the LSH values associated with candidate device fingerprints and/or the candidate device fingerprints within the data store (e.g. by passing pointers to the fingerprint server) and the second stage query can search those particular locations in the data store for a most closely matched candidate device fingerprint. In either case, the two-stage LSH query increases the efficiency of the search for matching fingerprints because the LSH values searched for in the second stage are not searched against all stored LSH values in the data store, but only the subset of LSH vales that were returned to the fingerprint server during the first stage query.

The concept of the two-stage LSH query can be further understood in the context of the following situation. Consider a data store having fingerprints $F_1$-$F_4$ and represented by Table 1.

TABLE 1

| Fingerprint | Associated LSH Values |
| --- | --- |
| $F_1$ | $A_1B_1C_3$ |
| $F_2$ | $A_2B_2C_2$ |
| $F_3$ | $A_1B_2C_3$ |
| $F_4$ | $A_3B_3C_1$ |

In the data store, fingerprint $F_1$ is associated with LSH values $A_1$, $B_1$, $C_3$, and similarly for the other stored fingerprint values in the data store, where $\{A_i\}$, $\{B_i\}$ and $\{C_i\}$ are the sets of LSH values in the A, B and C dimensions, respectively. Next consider an input fingerprint having associated LSH values $A_1B_2C_3$. A first stage LSH query can comprise a search for LSH values matching $A_1$ and $B_2$ in the data store. The search for $A_1$ can return into the memory of the fingerprint server the LSH values $F_1$ and its associated LSH values $A_1$, $B_1$ and $C_3$ (denoted as $F_1$:$A_1B_1C_3$) and $F_3$:$A_1B_2C_3$. Similarly, the search for $B_2$ can return into the memory of the fingerprint server $F_2$:$A_2B_2C_2$ and $F_3$:$A_1B_2C_3$. The search for $C_3$ in the second stage can be performed entirely in the memory of the fingerprint server and would identify $F_1$ and $F_3$ as possible matches as they are both associated with LSH value $C_3$. However, because $F_3$ contains the highest number of LSH values matching the LSH values in the input fingerprint, $F_3$ may be identified as the most closely matching fingerprint.

We note that in this situation, redundant stored fingerprints and LSH values can be stored in the fingerprint server memory. However, there are known techniques to avoid the storage of redundant information while keeping track of the number of times a LSH value would have been returned into the fingerprint server memory were redundancy allowed. One such technique, for example, comprises associating a single LSH value with more than one fingerprint by, for example, using a pointer. Of course, the situation described above is only intended to provide an overview of the procedure, and in practice the number of fingerprints can generally be extremely large and the number of dimensions of the fingerprint values can generally be appropriately large to provide for the desired identification.

While the discussion above of a multi-stage query refers to a two-stage LSH query, in some embodiments, a multi-stage LSH query can comprise three, four, five, or any number of stages. The advantages of a properly constructed single stage LSH query is also discussed above and below. In one embodiment comprising a three stage LSH query, the first stage query can be performed as described above. In a second stage, at least some input LSH values not queried in the first stage are queried against the LSH values associated with candidate device fingerprints and a set of LSH values associated with a subset of the candidate device fingerprints identified in the first stage LSH query is identified. The third stage of the query can be performed in the same manner as a second stage query in a two-stage LSH query embodiment with input LSH values not queried in the first or second stage queried against LSH values associated with the subset of candidate device fingerprints. A person of ordinary skill in the art will know how to generalize the teachings herein to LSH query embodiments comprising four or more stages.

FIG. 1 is a block diagram illustrating a request and fingerprint matching structure 10. An application server 16 may be configured to execute an application for serving requests from client devices 12 over the Internet 14. As part of an application's process, the application may require information substantially uniquely identifying a client device that is making a particular request. A separate fingerprint server (FP Server) 20 may be configured to formulate a fingerprint for the requesting device and to retrieve matching fingerprints from a data store containing fingerprint data, referred to herein as a fingerprint store (FP Store) 22. As explained in detail below, the Application can send request information 30 to FP Server 20. FP server 20 can then query 34 FP Store 22 to find stored fingerprints that potentially match the fingerprint formulated from request information 30. Any potentially matching stored fingerprints and other related information stored in FP server 20 can be communicated to FP server 20 in one or more responses 32. FP server 20 can select a most closely matching fingerprint and determine if the most closely matching fingerprint likely corresponds to a particular computing device previously identified by FP server 20. In such cases, FP server 20 can communicate to Application Server 16 a Client ID 26 corresponding the computing device and, furthermore, if the most closely matching fingerprint contains information not contained in the most closely matching fingerprint, FP Server 20 can update 24 the fingerprint information in FP store. We note that the block diagram is not intended to be limiting but refers to one particularly embodiment of a request and fingerprint matching structure.

As will be clear to the skilled artisan, in some embodiments, two or more of the Application Server, FP Server and FP Store may all be implemented in a single hardware server device. In other embodiments, the Application Server, FP Server and FP Store may each comprise several hardware servers, depending on the anticipated request volume and other requirements of a particular system. Any other arrangement using any number of physical or virtual servers may alternatively be used. For example in some embodiments, some system components may use inexpensive commodity hardware. In some embodiments, some system components may reside in a "cloud" or virtual environment in which resources are shared, such as a network and/or virtual machines.

Client devices may include a variety of hardware and/or software elements capable of sending data requests to—and receiving responses from an application server. As used herein, computing devices, server, and network device refer to devices with a processor, memory (e.g. volatile storage) and accessible storage. The computing devices can comprise, for example, personal computers, server computers, main frame computers, computing tablets, set top boxes, mobile telephones, cellular telephones, personal digital assistants ("PDAs"), portable computers, notebook computers, RF readers, barcode readers, light meters, laptop computers or any variations thereof now in use or developed in the future. Computing devices may run an operating system, including, for example, variations of the Linux, Unix, Microsoft Disk Operating System ("MS-DOS"), Microsoft Windows, Palm OS, Symbian, Android OS, Apple Mac OS, and/or Apple iOS operating systems. In general, the computing device may be coupled with a display. For convenience, display representations can be referred to as a graphical user interface or GUI, but in general this is intended to refer to traditional GUI formats, three dimensional display representations and/or future developed display formats as well as variations thereof Additionally, volatile memory as used herein refers to memory that requires power to maintain the information stored therein. Volatile memory can include, for example, random access memory ("RAM") or variations thereof, such as DRAM.

Furthermore, as used herein, a data storage device refers to any device capable of reading data stored thereon. A data storage device can be physically integrated with a computing device or can be a distinct device coupled to a computing device through a wired or wireless network connection. A data storage device can comprise for example one or more disk storage devices such as tape drives (analog or digital), floppy disk drives, ZIP disk drives, holographic data storage units, optical disk drives such as CD, DVD or Blu-ray Disc drives, minidisc drives, or hard disk drives; or flash memory/memory card storage devices such as xD-Picture card, MultiMedia Card, USB flash drive, SmartMedia, Compact Flash, Secure Digital, Sony Memory Stick, or solid state drive; or read only memory ("ROM"); or any combinations thereof. The data stores described herein may be located on a single data storage device or may be distributed across a plurality of data storage devices in whole (mirrored) or in part.

Although several embodiments below are described with reference to HTTP requests, data communications between a client device, the application server, and the FP server may use any suitable communication or integration protocol, including, but not limited to, REST, THRIFT, etc.

Introduction to Some Embodiments of Device Fingerprints

In some embodiments, after receiving a data request from a client 12, the application server 16 may extract portions of the request and transmit those portions to the FP Server 20 along with a request for a unique client Identifier ("client ID"). In some embodiments, the extracted portions of the client request transmitted from the application server 16 to the FP server 20 may form features of a fingerprint of the client device making the request. Thus, the data transmitted from the Application Server 16 to the FP server 20 is collectively referred to as fingerprint data, and each individual piece of information can be referred to as a fingerprint feature. Thus, for example a User Agent and an IP Address received in one client request may be treated as two fingerprint features. As will be clear to the skilled artisan, in some embodiments such items may be further sub-divided to form further features. For example, a User Agent string may contain many sub-strings, each of which may be treated as a separate fingerprint feature for use in the methods and systems herein. Similarly, any other fingerprint feature may be sub-divided to form additional features.

Further, fingerprint features may be directly represented or projected into any character set or language. For example, a plurality of fingerprint features may be represented as a concatenated string in binary or character form. Such a binary string may then be sub-divided or projected to any desired length using any repeatable algorithm. For example, in some embodiments, a projection of the first 'k' bits of the binary string or positions in a character string may be used to form an LSH value (as will be discussed in further detail below).

Fingerprints can comprise a variety of client device identifying information. In some embodiments, client request data from which a fingerprint may be formed may include HTTP header information such as a User Agent string, an HTTP_ACCEPT Header, an indication of whether or not cookies are enabled, or other HTTP header information. In some embodiments, an application server may also direct a client device to execute code which may provide additional details which may be included in a fingerprint. For example, such code may also reveal information such as a list of installed browser plugins, a list of installed fonts, a time and date as reported by the client device, a time zone, a size and/or resolution and/or color depth of the client's display, and/or other information describing one or more aspect of the client device.

Additionally, information from lower layers of the open systems interconnection (OSI) stack may also be used to form a client device fingerprint. Such lower-layer information may include, but is not limited to, an IP address or a TCP parameter such as an Initial packet size, an Initial TTL, a Window size, a Max segment size, a Window scaling value or others. In some embodiments, features and information used to form a fingerprint may be obtained from one or more external databases based on correlations with one or more of the pieces of information above. For example, a requesting client's IP address may be looked up in a geolocation database to obtain city, state and/or country or other geographic information associated with the IP address. Such geographic information may then be used as a fingerprint feature in some embodiments.

Fingerprints can be formed from the client request data in a variety of ways. In some embodiments, each client device fingerprint may comprise a string formed by concatenating all of the collected fingerprint features in a reproducible sequence. In alternative embodiments, the term "fingerprint" may refer to a transformation of concatenated fingerprint data through a suitable hash function. In some embodiments, a full-length fingerprint may be stored in a database along with a shorter key or index that may be obtained by hashing or otherwise compressing a full-length fingerprint. In some embodiments, it can be desirable to form a fingerprint from some or all of the information contained in the User Agent information, IP address, display resolution, time zone of the client computing device, list of browser plug-ins and/or list of installed fonts.

Hash functions as used herein include any well-defined procedure or mathematical function that converts a large, possibly variable-sized, amount of data into a small datum with a high probability of uniqueness. The values returned by a hash function are called hash values, hash codes, hash sums, checksums or simply hashes. Any suitable hash function may be used to transform fingerprints and/or LSH values into smaller data for storage and use with the systems and methods described herein. We note that hash functions may be different from locality-sensitive hashing. Specifically, locality-sensitive hashing comprises grouping fingerprint features into segments, and hashing with hash functions, in the context of the present description, corresponds to reducing the amount of data to be stored by applying a hash function to the LSH values.

Therefore, in some embodiments, LSH values and/or fingerprint values may be stored as full-length raw text, and in other embodiments, LSH values and/or fingerprint values may be stored as reduced-length hash values resulting from the application of a hash function. Appropriate hash functions for use with the methods described herein are not particularly limited and can include a hash function producing hashes with any desired length (e.g. number of bits). Appropriate hash functions include, but are not limited to, current and future versions of the secure hash algorithm ("SHA") or of the method digest algorithm ("MDA").

Some Embodiments of Process Constraints

In some embodiments, constraints may be placed on the client ID lookup process. For example, client requests are typically experienced by the application server as a streaming series of requests, each of which is served an appropriate response within a very short period of time. In order to determine what response is appropriate, an Application Server may need to determine an identity of the requesting device. In some embodiments, an application requesting a client ID from an FP server may require a response within a particular time frame in order to prevent disruption or delay to the application. In some embodiments, the system may be configured to scale linearly when encountering increased traffic and additional features and functions.

Some Embodiments of Structure and Content of FP Store

The FP store may comprise any suitable database architecture as desired. For example, in some embodiments, the FP store may comprise a relational database management system such as MYSQL, PostgreSQL, MS SQL Server, Oracle, Sybase, or any other suitable system. The FP store database may also be accessible using any suitable query language, such as SQL or XQuery or others. As will be clear to the skilled artisan, a relational database typically contains a number of tables with inter-related information such that rows in one table may be associated with rows in another table by a common field such as a unique identifier. In alternative embodiments, any of the various types of NoSQL database management systems may be used (such as Key-value Store systems, BigTable systems, Document-Store systems and Graph Database systems).

In some embodiments, a Persistent Distributed Key-Value Store database management system may be particularly well-suited to addressing latency and scaling constraints. In particular, distributed Key-Value Store databases are designed for efficient, low-latency read-write operations by key, usually through the use of a distributed hash table. Furthermore, such distributed Key-Values Store databases can be generally much easier to scale by adding more nodes and re-distributing the data. Examples of Key-Value Store database management systems include, but are not limited do, Virtuoso Universal Server, OpenLink Virtuoso, Membase, Memcached, MemcacheDB, Cassandra, Hbase Riak, Redis, Couchbase and the like.

In some embodiments, the FP store may comprise a table of client device fingerprint values, where each unique fingerprint value is associated with a client ID. In some embodiments, a single client ID may be associated with a plurality of fingerprint values. For example, in some embodiments, a client ID may identify a single user, and may be associated with a plurality of devices owned or operated by that user, such as a mobile phone, a tablet computer and a desktop computer. Such client ID values may take the form of any numeric, alphanumeric, binary or other string value which may be consistently uniquely recognized. In some embodiments, fingerprint values stored in the FP store may comprise full-text strings of fingerprint data. In other embodiments, fingerprint values stored in the FP store may comprise hash values of fingerprint data. In other embodiments, a fingerprint may have an associated unique index or key that is shorter than the full-length fingerprint. Such index or key values may be obtained by hashing the fingerprint.

In some embodiments, the FP Store may also comprise one or more tables containing Locality-Sensitive Hash values ("LSH values") obtained by hashing selected portions of the fingerprint data. In some embodiments, the LSH value table may comprise a plurality of LSH values which may be associated with one or more fingerprint values in a many-to-many relationship. As will be discussed in further detail below, a single LSH value may be associated with a plurality of fingerprints, and a single fingerprint may be associated with a plurality of LSH values.

As mentioned above, locality-sensitive hashing can involve a dimension reduction of high-dimensional data, which in the context of device fingerprints, can comprising reducing the full device fingerprint into segments, where each segment may be treated as a dimension of the full device fingerprint. In some embodiments, each segment comprises only a portion of the full device fingerprint such that only a portion of the information in the full device fingerprint is used to form each segment. In an LSH method, input items are formed so that similar items are mapped to the same buckets with high probability, the number of buckets being much smaller than the universe of possible input items.

In some embodiments, LSH values may be obtained by combining selected features of the fingerprint data into segments. In some embodiments, such segments may be formed by selectively grouping (e.g. by concatenation) fingerprint feature items. As noted above, a feature can comprise a portion of the fingerprint which may or may not correspond to a concept, for example, when a fingerprint is hashed. Each group can be formed from a single feature or subset of all of the features and any given group may or may not include features from another group. For example, in one embodiment the following items may represent individual fingerprint features: (1) a User Agent string; (2) a list of installed browser plugins; (3) a display size and/or color depth; (4) a list of installed fonts; and (5) an IP address of the client device. Segments may be taken as the individual features and/or formed by concatenating groups of these features. Then LSH values thus formed may also be transformed with a hashing function as described above.

In some embodiments, several LSH values may be obtained by grouping fingerprint features into segments. Thus, in one embodiment, using the example above, six different LSH values may be obtained: One by concatenating all 5 features and transforming the result; a second by concatenating and transforming only features (1), (2), (3), and (4) together; a third by concatenating and transforming features (1), (2), (3), and (5) together; a fourth by concatenating and transforming features (1), (2), (4), and (5) together; a fifth by concatenating and transforming features (1), (3), (4), and (5) together; and a sixth by concatenating and transforming features (2), (3), (4) and (5) together. Thus, in some embodiments N+1 LSH values may be obtained by concatenating and transforming N fingerprint features in N groups of N−1 features plus one group containing all N features. In other embodiments, any number of LSH values from 1 to the maximum number of distinct possible subsets of N features may be used. In some embodiments, N may be any positive number, and may be constrained only by the design constraints of a particular system. For example, N can be 1, 10, 1000, 10000, 100000, 1000000 or more. In other embodiments, N can be between 1 and 200, between 2 and 100, or between 2 and 20. A person of ordinary skill in the art will recognize that additional ranges of N within the explicit ranges above are contemplated and are within the present disclosure. A plurality of LSH values for each fingerprint can be effectively used for 1 stage or multiple, e.g., two, stage queries based on the teachings herein.

In some embodiments, the LSH values can be obtained by grouping all of the fingerprint features into a single string and dividing the full string into segments with lengths of 'k' bits, bytes or characters, where each segment may or may not comprise portions of more than one feature. For example, again referring to the example above, the fingerprint can be represented by a character string formed by concatenating features (1)-(5), in that order, and LSH values can be formed by choosing k characters from the character string. Therefore, if the User-Agent feature is "Microsoft-InternetExplorer9" and if a first LSH value is taken as the first 4 characters of the fingerprint, the first LSH value would be "Micr" and this value can be used during the first and/or second stage of the LSH query. Similarly, the above described fingerprint can be transformed into a binary representation of the character string and LSH values can be formed by choosing a k-bit segment of the binary string. Therefore, if the binary representation of the string were "010010110101001111," and if a first LSH value is taken as the last 4 bits of the transformed fingerprint, the first LSH value would be "1111". When forming LSH values using segments of a fingerprint, all LSH values need not be of equal length (e.g. k may be different for two or more LSH values formed from a fingerprint). That is, a fingerprint may be divided into any number of LSH values (which may or may not overlap), each of which may have any length, provided that the formation of fingerprints and the conversion of fingerprints into LSH values is consistent throughout the system. k may take any positive integer value and is limited only by the length of the fingerprint and the computational resources available for implementing the method described herein. In some embodiments, k can be 1, 10, 100, 1000, 10000, 100000 or more. A person of ordinary skill in the art will recognize that additional ranges of N within the explicit ranges above are contemplated and are within the present disclosure. As previously mentioned, locality sensitive hashing involves the dimensional reduction of a full fingerprint and a person of ordinary skill in the art will be able to apply the teachings described herein to adapt different locality-sensitive hashing techniques for use in the invention described herein.

In alternative embodiments, the selection of fingerprint features to be converted to LSH values may be based on an analysis of historical request data which may be assembled by storing fingerprint data from a wide range of different requesting client devices. An analysis of such historical data may be employed to determine an optimal set of feature groups (which may be based on some of the input feature values themselves) for use as LSH values for identifying unique fingerprints. In this way, features that are too common (i.e., insufficiently unique) or features that change too frequently might be excluded from some LSH groups. For example, if a fingerprint comprises a browser type (e.g. "MSIE") as one feature and a browser version (e.g. "9.1.101") as another feature, and the browser is known to have frequent updates such that the browser version changes frequently, it may be desirable to form at least some of the LSH values without including the browser version or including only a portion of the browser version (e.g. "9.1" or simply "9"). Likewise, features that are empirically determined to be substantially un-changing over a substantial number of requests from a known unique fingerprint may be selected for inclusion in some or all LSH groups.

Notwithstanding the process used to create LSH values, LSH values can be selected to adjust the sensitivity of a particularly query. For example, LSH values created from an input fingerprint can comprise LSH values that are broad, meaning that they are common to a large number of device fingerprints in a data store. Some other LSH values created from the input fingerprint can comprise LSH values that are narrow, meaning that they are common to a small number of device fingerprints in the data store. In some embodiments, broad input LSH values (i.e. those formed from input fingerprints) can be queried in a first search query that identifies a relatively large number of LSH values and narrow input LSH values can be queried against the returned LSH values associated with candidates device fingerprints. In other embodiments, the first stage query can be performed with narrow LSH values and the second stage query can be performed with the broad LSH values. The balance between broad an narrow LSH values can be determined experimentally.

In some embodiments, one or more LSH values associated with an input fingerprint to be added to the data store may already exist in the data store. In such cases, rather than duplicating the LSH value, the new fingerprint may be added to the data store and associated with the existing LSH value by a pointer, a key or other relationship-defining data.

Some LSH values may be identically duplicated for two or more different device fingerprints. Thus, in some embodiments, the FP Store may include a database table which contains only unique LSH values. In some embodiments, the LSH value table may also include a unique key or index value for each unique LSH value. In some embodiments, each LSH value (or its unique key) may be associated with one or more fingerprints by suitable pointers or other relationships. Some LSH values may be associated with a plurality of fingerprints and/or device ID values.

In some embodiments, all LSH values obtained from all groupings of fingerprint features may be stored in a single database table. In other embodiments, LSH values may be stored in separate tables based on the group of features used to obtain the LSH values. In either case, each LSH value will preferably be associated with all fingerprint values having a set of corresponding features that hash to that LSH value.

Some Embodiments of FP Matching Processes

Figure 2:
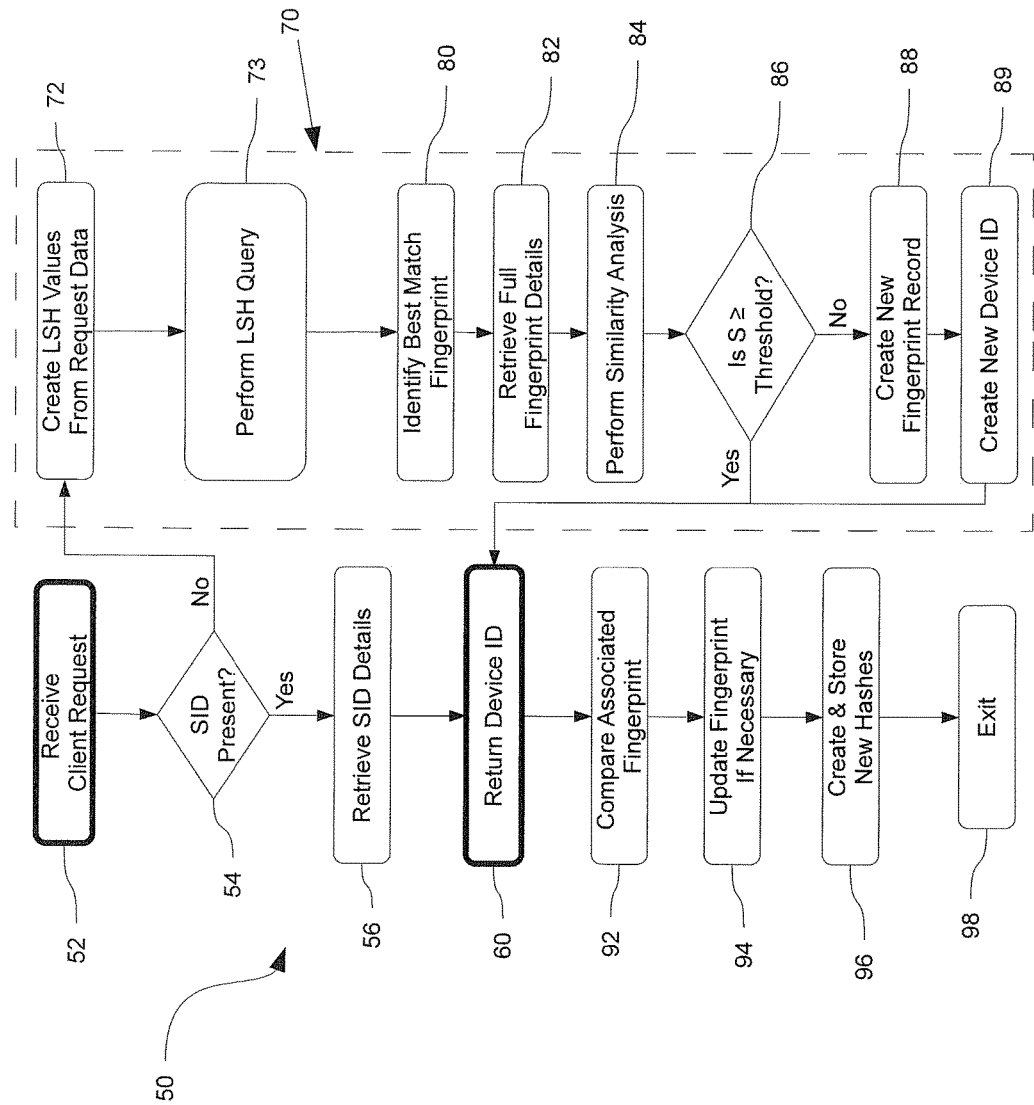
FIG. 2 is a flow chart illustrating one embodiment of a client-identification process.

FIG. 2 provides a flow chart illustrating an embodiment of a Client ID lookup process 50 which may be executed by the FP Server 20 accessing data stored in the FP Store 22 of FIG. 1. As shown in FIG. 2, upon receiving a client request 52 from a client device, the process may first check to determine whether the request contains an active session identifier ("SID" or "session ID") 54. In some embodiments, a session ID may be contained within a cookie, shared persistent object, or other portion of the client request.

The FP Store may include a database of active session ID values stored with an associated device ID and device fingerprint. Thus, if an active session ID is present in the request, the FP server process may simply look up the corresponding session ID 56 in the FP store and return an associated Device ID and/or device fingerprint 60. Additional database maintenance steps, such as comparing 92 and updating 94 a stored fingerprint may also be performed as needed. Embodiments of such steps will be described in more detail below.

Figure 3:
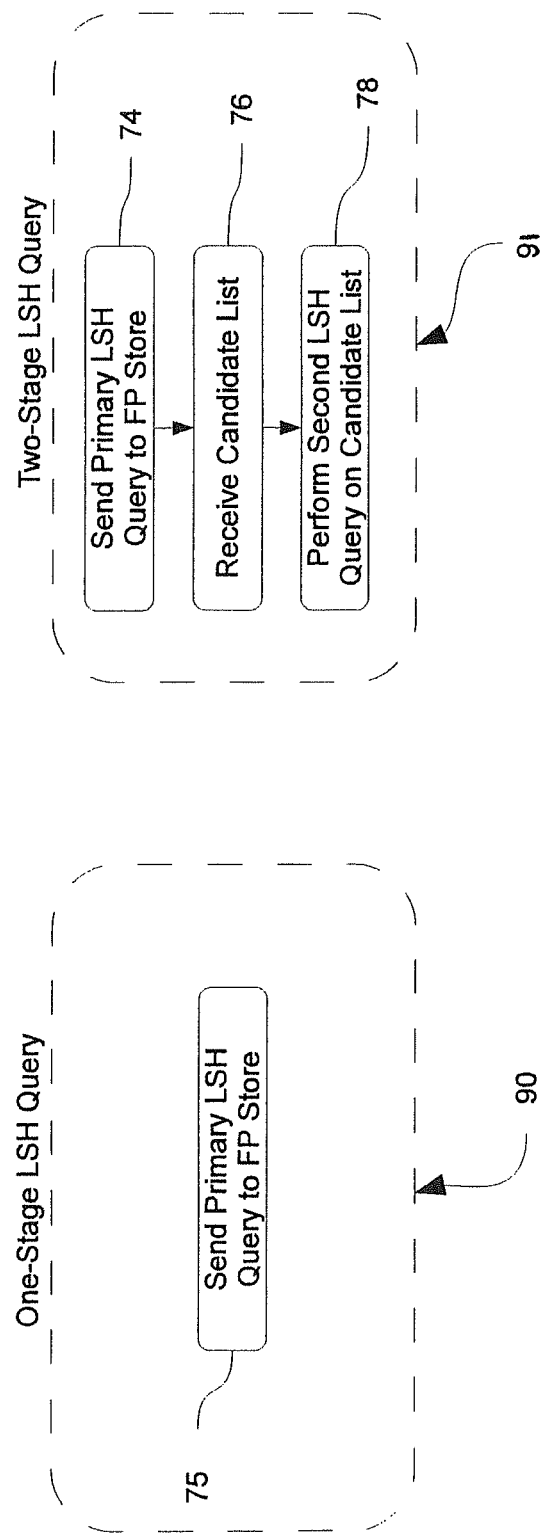
FIG. 3 is a pair of flow charts illustrating alternative LSH Query methods that may be used in the client-identification process of FIG. 2.

If a session ID is not present in the client request or if the session ID is not found in the FP Store, the FP Server process may initiate a fingerprint matching sub-process 70. Fingerprint matching sub-process 70 can comprise LSH query process 73. In some embodiments, LSH query process 73 may comprise either one-stage LSH query process 90 or two-stage LSH query process 91 that may be executed by the FP Server, as represented in FIG. 3. In some embodiments, a fingerprint matching sub-process 70 may comprise the steps of transforming the request data into a collection of input LSH values 72; transmitting some or all of the input LSH values to the FP store to perform LSH query 73 and identifying the most closely matching fingerprint (80). In some embodiments, LSH query 73 can comprise single stage query 90 including sending the LSH query to the FP store 75. In some embodiments, LSH query 73 can comprise two stage query 91 comprising sending primary LSH query to the FP store 74; receiving a first candidate list from FP store 76; and performing a second LSH query against the candidate list 78.

In some embodiments, the step of creating LSH values from received client request data 72 may substantially parallel the process used to create LSH values stored in the FP Store. Thus, for example, if the LSH values in the FP Store were created using the five-feature example given above, the LSH values to be used as query inputs may preferably be created in the same way. In some embodiments, a step of creating input LSH values may comprise creating a small number of relatively broad input LSH values, such as by hashing substantially fewer than all of the available features.

A query for a fingerprint in the FP store matching an input fingerprint can comprise a query for matching LSH values in a single stage or in multiple stages, as represented by query decision point 73 in FIG. 2. In one embodiment of a single stage query, all or a selected subset of the input LSH values to be queried against the FP store in an LSH query 75 may be queried sequentially or in parallel. In other embodiments of a single stage query, if more query time is available (e.g. if request volume is relatively low) each input LSH value may be queried against the FP Store in series. In each instance, the query can identify stored LSH values in the data store matching the input LSH values and associated stored fingerprints. Furthermore, in some embodiments, the number of times a stored fingerprint is associated with a stored LSH value matching an input LSH value can be computed during each of the searches. In other embodiments, less than all of the input LSH values can be queried against the FP store. In some embodiments, the LSH values queried may be designed to return a relatively large number of results in exchange for doing so relatively quickly, for example, because those LSH values are relatively common in the database. Thus, in some embodiments, the number of LSH values queried can be only as many as is likely to be needed to produce a result set that has a high probability of including the "correct" match.

In a one stage query, the comparison of multiple LSH values provides for the possibilities for each LSH value formed from less than all fingerprint features to have no matches, one match or more than one match from the candidate fingerprints in the database. The different LSH values may or may not be weighed differently, as described further below. Based on the number of matches, a determination can be made whether the input LSH values for the client device likely corresponds with a fingerprint in the database or likely does not correspond with a fingerprint in the database, which correspondingly provides for an identification of the device as a particular known device or a new device within a particular confidence range.

In some embodiments, a multiple-stage LSH query can be implemented. In first stage 74 of a two-stage LSH query embodiment, a subset of the input LSH values can be queried against the FP Store in a first stage 74 and a list of candidate device fingerprints can be identified and optionally moved into separate storage, such as volatile storage. In some embodiments, the step of receiving a list of candidates 76 may comprise receiving a multi-dimensional array of LSH values matching the input LSH values from one or more queries. In some embodiments, the returned list of candidates may also include fingerprint ID and/or device ID values associated with the LSH values matched during the first query. In some embodiments, the list of candidates may also include additional LSH values associated with candidate fingerprint ID values (or device ID values), but that were not necessarily matches during the first query. The list of candidates will typically include LSH and other values corresponding to more than one device ID, and may include results corresponding to hundreds of device IDs or more. For example, as previously discussed, a stored fingerprint can be associated with a plurality of LHS values. Therefore, a query for a specific input LSH value may return a matching stored LSH value as well as LSH values not matching the specific input LSH value, but associated with a fingerprint that has at least one associated stored LSH value matching the specific input LSH value.

Once a list of candidates has been received in the FP Server 76, a second stage LSH query may be performed 78 against the candidate list with at least some of the LSH values not queried in the first stage LSH query. In some embodiments, the second stage LSH query may be configured to identify matches with a higher or lower degree of sensitivity than the first LSH lookup, so as to return a much smaller or larger number of results, respectively. In some embodiments, the second-stage LSH query of the candidate list may be conducted substantially entirely in volatile memory, thereby allowing the second LSH lookup query to be much more detailed while still being performed in a very short time period.

Similar to a one stage query embodiment, in a two-stage query embodiment, the comparison of multiple LSH values provides for the possibilities for each LSH value formed from less than all fingerprint features to have no matches, one match or more than one match from the candidate fingerprints in the database. In some embodiments, where the first stage LSH query fails to identify any matching input LSH values in the FP store, it can be determined that the input fingerprint does not correspond to the same client computing device as any of the stored fingerprints in the data store. In other embodiments, where the first stage query fails to identify any matching input LSH values, the second stage can query can be performed against the FP store instead of against the results returned from the first stage query which, in this instance, is a null set. In general, the different LSH values may or may not be weighed differently, as described further below. Based on the number of matches, a determination can be made whether the input LSH values for the client device likely corresponds with a fingerprint in the database or likely does not correspond with a fingerprint in the database, which correspondingly provides for an identification of the device as a particular known device or a new device within a particular confidence range.

As described above, the degree of sensitivity of the first and/or second stage LSH query can be adjusted. In particular, the sensitivity of the first and/or second stage can be adjusted by selecting input LSH values that are known in advance or expected to be more or less common in the FP store. An input LSH query using common LSH values (lower sensitivity) can therefore return a larger number of matching LSH values relative to an input LSH query using less common LSH values (higher sensitivity). For example, an input LSH query of an input LSH value formed from the client device browser type is likely to return more matching fingerprints relative to an input LSH query of an input LSH value formed from the client device hard drive serial number.

In some embodiments, finding matching input LSH values can comprise finding stored LSH values in the FP store that exactly match the input LSH values. In other embodiments, finding a matching input LSH value can comprise finding stored LSH values that match the input LSH value to a desired degree of similarity. In such embodiments, any differences between an input LSH value and an LSH stored in the FP store can be quantified by a similarity function. The resulting value of such a similarity function can be compared with a threshold value above or below which the input LSH value and the stored LSH value in the FP store can be considered a match. The threshold value can be determined experimentally. Some suitable similarity functions are discussed below in the context of matching entire fingerprints.

Identifying the most closely matched fingerprint 80 may include evaluating the results of the single stage or multiple stage queries to determine which fingerprint is associated with the largest number of query hits. The number of query hits can be defined as the number of times a stored fingerprint is associated with an LSH value that is matched with an input LSH value during a LSH query or, in the case of a two-stage LSH query, during the first and/or second stage of the query.

In some embodiments of a two-stage LSH query, hits from the second or first stage of the LSH query may be weighted differently than hits from the second or first stage of the LSH query, respectively, and similarly for multiple-stage LSH query embodiments. In some embodiments, a feature-specific weighting factor may be applied to an algorithm for identifying the most closely matched fingerprint 80 by counting a "hit" as a real number greater than 1, equal to 1, or less than 1 based on the desired weight of the matched feature(s). For example, if it is desirable to give a lesser weight to a feature, then query results matching LSH values based that feature (alone or in combination with other features) may be counted as less than one hit. On the other hand, if it is desirable to give more weight to a feature, then query results matching LSH values based on that feature may be counted as more than one hit. Furthermore, if it is desirable not to give a feature more nor less weight, then query results matching LSH values based on that feature may be counted as one hit. In some embodiments, the weighting factors can be normalized such that the sum of all weighting factors applied to the LSH values associated with a fingerprint is equal to 1.

In further embodiments, additional factors may be considered and/or weighted in determining a most closely matching fingerprint 80. In some embodiments, a visit history associated with a candidate or fingerprint may be used to weight results. For example, if one or more LSH queries returns both fingerprint 'Q' and fingerprint 'R' as candidate device fingerprints, wherein the difference in the total number of LSH matches (i.e. hits) is within a threshold value determined to be too close to identify one as the closest match, then visit history information associated with the respective candidate fingerprints 'Q' and 'R' may be used to pick a most closely matching candidate device fingerprint. The threshold value can be determined experimentally. In various embodiments, visit history data may include click trails, customer data, user data, visited domains, or other information associated with a candidate fingerprint. For example, various heuristic or machine learning techniques may be applied to determine whether a visit history associated with the input fingerprint device more closely matches a visit history associated with fingerprint 'Q' or that associated with fingerprint 'R'.

Once the most closely matched fingerprint is identified 80, full details of the fingerprint and associated candidate may be retrieved 82 from the FP store, if needed (i.e. if not returned to the Fingerprint server during the two-stage LSH query). In some embodiments, full details of a fingerprint may include the full text of a request and any other collected fingerprint data. In other embodiments, full details of a fingerprint may include full text of the portions of the request used as fingerprint features. In other embodiments, full details of a fingerprint may include hash values of a full request, or portions thereof. In some embodiments, the step of retrieving full details of a most-frequent fingerprint may be unnecessary if such information was obtained in a previous step.

Due to inevitable variations in client device configurations over time (such as the installation of new fonts or plugins), device fingerprints based on configuration elements may also change over time. In some embodiments, a similarity analysis may then be performed 84 to compare the device fingerprint of the requesting client with the most-frequently hit fingerprint (which may also referred to herein as the candidate best-match or most closely matching fingerprint). Such similarity analysis may include any algorithm or function capable of comparing two text strings to provide a quantitative measure of how closely the two strings match one another. For example, a similarity analysis may include an approximate string matching technique such as a function to determine an edit distance between the candidate best-match fingerprint and the requesting device fingerprint. In other embodiments, a similarity function may include an entropy function, a Hamming function, a Levenshtein distance function, a Mutex function, a Soundex function or other suitable similarity function.

A result of a similarity function may then be compared with a threshold value 86. While it is not necessary that a candidate best-match fingerprint be an exact match with the requesting client-device fingerprint, it is desirable that the match be "close enough." Thus, a quantitative result of the similarity analysis may be compared with a threshold value to determine whether the match is close enough, or whether too much uncertainty remains. The exact degree of similarity used as a threshold value may be determined empirically by experimentation. Alternatively, exact degree of similarity used as a threshold value may be determined by modeling other methods.

If the candidate-match fingerprint is determined to be sufficiently similar to the requesting client-device fingerprint, the device ID associated with the matching fingerprint may be obtained from the FP store (if necessary), and communicated to the Application Server 60.

Some Embodiments of Database Maintenance Steps

As discussed above, when a positive device ID match is found (either by identifying a matching SID or a matching fingerprint), the fingerprint of the requesting client device may be compared 92 with the fingerprint of the matched device ID. If a fingerprint associated with the returned device ID does not exactly match the requesting client-device fingerprint, the stored fingerprint may be updated 94 with the information presented by the requesting client device. Such updating may also include generating and storing new LSH values 96 as discussed above. In some embodiments, the step of creating and storing new hash values 96 may be limited to updating only the LSH values affected by the detected changes. In other embodiments, the step of creating and storing new hash values may be omitted, such as in a case where the changes are determined to be substantially small. In some embodiments, following updating the method can exit 98.

In some cases, client systems within some corporate, government, educational institution, mobile and "hotspot" networks (collectively referred to as "black box networks") may be configured such that multiple devices within the network produce identical fingerprints using a fingerprinting algorithm that otherwise creates substantially unique device fingerprints. In some embodiments, such black box network fingerprints may be identified by a pattern of requests in which a single fingerprint is associated with requests carrying different session ID values over a very short period of time. In some cases, requests may be received with matching fingerprints but alternating session ID values. Such a pattern may also be indicative of a black box network with similarly-configured devices. A series of interlaced requests for very different URLs from otherwise apparently identical clients may also be indicative of a black box network.

In some embodiments, fingerprints associated with black box networks may be ignored. In other embodiments, fingerprints associated with black box networks may be made more specific by obtaining and including additional information (e.g., additional fingerprint features) in the fingerprint. For example, clients within a black box network may be identified by creating a fingerprint from features such as a pattern of requests, identifying unique cookies or shared persistent object cookies (aka "flash cookies"), a pattern of websites visited, or other available information.

In some embodiments, clients within a black box network may be distinguished by detecting varying patterns of requests for consistently different domains, subdomains, or URLs, or patterns of requests carrying different session identifiers (e.g., cookies, flash cookies, or other session identifying information). For example, unique clients may be identified by the relative interlacing in patterns of timing and/or identity of the requested URLs. For example, assume 'A,' 'B,' 'C,' 'D' and 'E' represent 5 session identifiers. A request pattern from a black box network of the form: [A, B, C, B, D, C, A, E, C, A, A, C] may be referred to as highly interlaced, and may represent several distinct clients. In contrast, a pattern of requests of the form: [A, A, A, B, B, C, C, C, D, E, E] may be referred to as low level interlaced, and may suggest the presence of only one or two unique client devices. An analysis of the relative timing of these requests may allow further differentiation, because, in some embodiments, requests separated by very short time spans may be assumed to have originated from the same client device. The degree of interlacing in patterns above which the requesting computing device is considered a black box network can be determined experimentally.

In some embodiments, an application server may be directed to request additional information from devices carrying fingerprints or fingerprint features associated with such black box networks. For example, if a particular IP address is determined to be associated with a black box network, the Application Server may be instructed to request additional fingerprint features from client devices to improve the chances of uniquely identifying devices within such a black box network.

In some embodiments, a date/time may also be stored in the database to indicate the last date and/or time when the fingerprint was last updated. A date/time may also be stored to indicate the last date/time a stored fingerprint was matched to a requesting client device.

If the requesting client-device fingerprint is not sufficiently similar to the candidate-match fingerprint, the requesting client-device fingerprint may be assumed to be "new" relative to all fingerprints stored in the FP Store. In such embodiments, the new fingerprint may be stored 88 along with LSH values obtained by hashing groups of fingerprint features as discussed above. If needed, a new Device ID value may also be created and stored 89.

In some embodiments, stored fingerprints that are not matched to any requesting client devices for a substantial period of time (e.g., a time on the order of weeks, months or years) may indicate a "stale" fingerprint that is not likely to be matched to future requesting client-devices. Stale fingerprints may be deleted from the database, or otherwise removed from a set of potential match candidates. Removing stale fingerprints may reduce the size of a database in the FP Store, which may improve matching time. Stale fingerprints may be removed by using Time To Live (TTL) or any other suitable method available to the skilled artisan.

In some embodiments, a plurality of unique client device identifiers (e.g., Device IDs), may be associated with a single common unique user identifier. Many people use multiple web browsing devices. For example one user might own and use a mobile phone, a tablet, a work computer and a home computer to browse web sites. When a user logs in to a single site (or otherwise provides information sufficient to identify himself) from both a mobile phone and a laptop computer (or any other browsing device) where both devices are recognized by unique device identifiers in the system, the system may assign a common unique user identifier to both the mobile phone and the laptop device IDs. In this way, a single user may be associated with any number of browsing devices. By analyzing patterns of usage, the system may determine whether a particular device is shared with other users or is uniquely used by a single user. For example, if a single user repeatedly logs into a web site or service from two different devices, both devices may be associated with a common User ID. In some embodiments, a unique user ID may be returned to an application server in place of or in addition to a client device identifier.

The specific embodiments above are intended to be illustrative and not limiting. Additional embodiments are within the broad concepts described herein. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

In particular, a variety of hardware and software implementation details and techniques may be employed as within the level of those with skill in the relevant art. Furthermore, reference to a singular item, includes the possibility that there are plural of the same items present. More specifically, as used herein and in the appended claims, the singular forms "a," "and," "said," and "the" include plural referents unless the context clearly dictates otherwise. As used herein, unless explicitly stated otherwise, the term "or" is inclusive of all presented alternatives, and means essentially the same as the commonly used phrase "and/or." Thus, for example the phrase "A or B may be blue" may mean any of the following: A alone is blue, B alone is blue, both A and B are blue, and A, B and C are blue. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

We claim:

1. A method of identifying computing devices within a black box network, implemented on a fingerprint server comprising a communication channel with a data storage device, the method comprising:
analyzing a plurality of sequential request features received at different times, wherein the request features are obtained from a plurality of requests from at least one computing device associated with at least one device fingerprint, wherein at least some of the request features are identical, and at least two of the request features comprise session identifiers, wherein the analyzing comprises determining timing patterns in identical request features, at least one of the timing patterns comprising a degree of interlacement of the session identifiers; and
determining, based on the timing patterns, an estimate of a number of the one or more computing devices within the black box network.

2. The method of claim 1, wherein each request feature comprises a domain, subdomain or URL and wherein the analyzing comprises identifying timing patterns in identical domains, subdomains or URLs.

3. The method of claim 1, wherein analyzing a plurality of sequential request features comprises identifying unique cookies or shared persistent object cookies.

4. The method of claim 1, wherein analyzing a plurality of sequential request features comprises analyzing a pattern of websites associated with the computing device.

5. The method of claim 1, further comprising:
determining whether any of the plurality of requests originate from the black box network; and
in response to determining that a request of the plurality of requests originates from the black box network, requesting additional information from a computing device associated with the request.

6. A system for identifying computing devices within a black box network, the system comprising:
a data storage device;
a fingerprint server comprising a communication channel with the data storage device, the fingerprint server having program code that, when executed by a processor, executes a method comprising:
analyzing a plurality of sequential request features received at different times, wherein the request features are obtained from a plurality of requests from at least one computing device associated with at least one device fingerprint, wherein at least some of the request features are identical, and at least two of the request features comprise session identifiers, wherein the analyzing comprises determining timing patterns in identical request features, at least one of the timing patterns comprising a degree of interlacement of the session identifiers; and
determining, based on the timing patterns, an estimate of a number of the one or more computing devices within the black box network.

7. The system of claim 6, wherein each request feature comprises a domain, subdomain or URL and wherein the analyzing comprises identifying timing patterns in identical domains, subdomains or URLs.

8. The system of claim 6, wherein analyzing a plurality of sequential request features comprises identifying unique cookies or shared persistent object cookies.

9. The system of claim 6, wherein analyzing a plurality of sequential request features comprises analyzing a pattern of websites associated with the computing device.

10. The system of claim 6, wherein the method executed by the processor further comprises:
determining whether any of the plurality of requests originate from the black box network; and
in response to determining that a request of the plurality of requests originates from the black box network, requesting additional information from a computing device associated with the request.

11. A non-transitory computer-readable medium storing instructions that when executed by a computer system, cause the computer system to perform a method of identifying computing devices within a black box network, the method comprising:
analyzing a plurality of sequential request features received at different times, wherein the request features are obtained from a plurality of requests from at least one computing device associated with at least one device fingerprint, wherein at least some of the request features are identical, and at least two of the request features comprise session identifiers, wherein the analyzing comprises determining timing patterns in identical request features, at least one of the timing patterns comprising a degree of interlacement of the session identifiers; and determining, based on the timing patterns, an estimate of a number of the one or more computing devices within the black box network.

12. The non-transitory computer-readable medium of claim 11, wherein each request feature comprises a domain, subdomain or URL and wherein the analyzing comprises identifying timing patterns in identical domains, subdomains or URLs.

13. The non-transitory computer-readable medium of claim 11, wherein analyzing a plurality of sequential request features comprises identifying unique cookies or shared persistent object cookies.

14. The non-transitory computer-readable medium of claim 11, wherein analyzing a plurality of sequential request features comprises analyzing a pattern of websites associated with the computing device.

* * * * *